Dec. 8, 1970    J. A. EARL    3,545,950

METHOD OF MAKING A GLASS-TO-METAL SEAL

Filed June 28, 1967    3 Sheets-Sheet 1

INVENTOR
John A. Earl

ATTORNEYS

Dec. 8, 1970    J. A. EARL    3,545,950
METHOD OF MAKING A GLASS-TO-METAL SEAL
Filed June 28, 1967    3 Sheets-Sheet 2
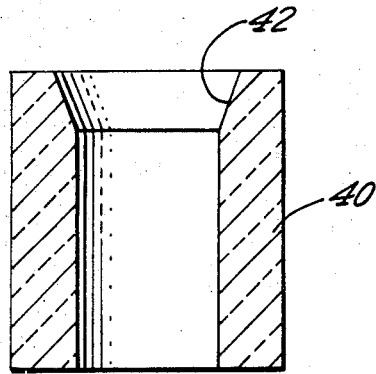
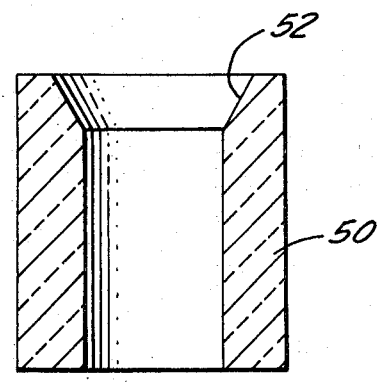
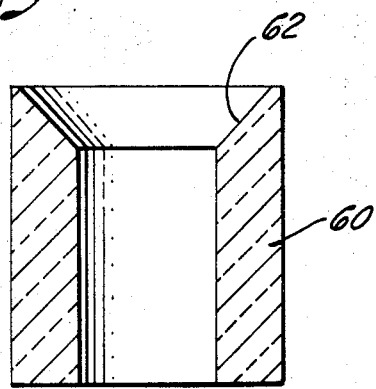
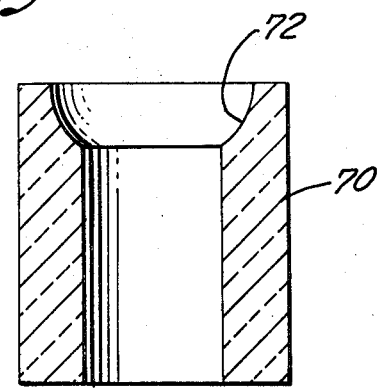
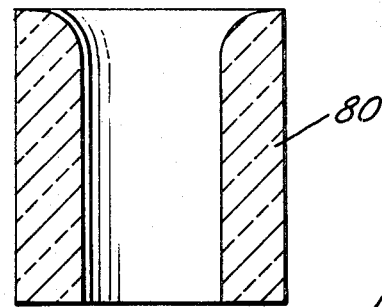
INVENTOR:
John A. Earl
ATTORNEYS

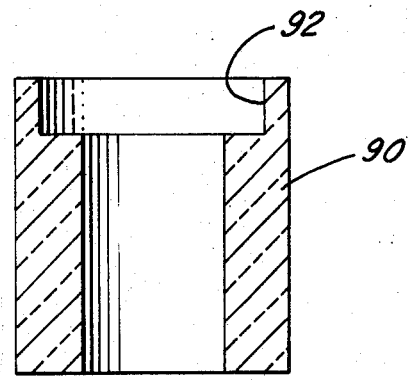
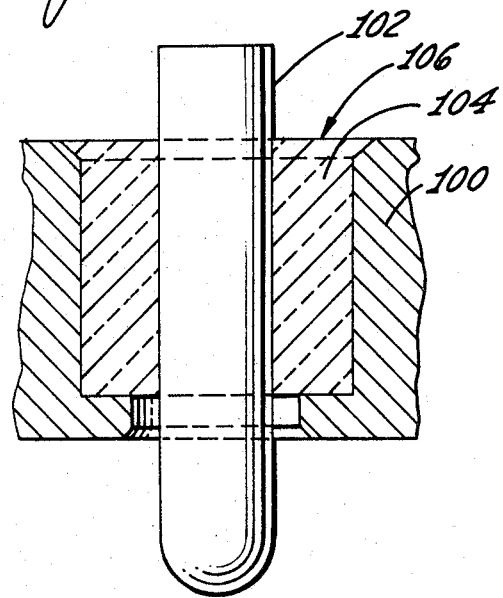
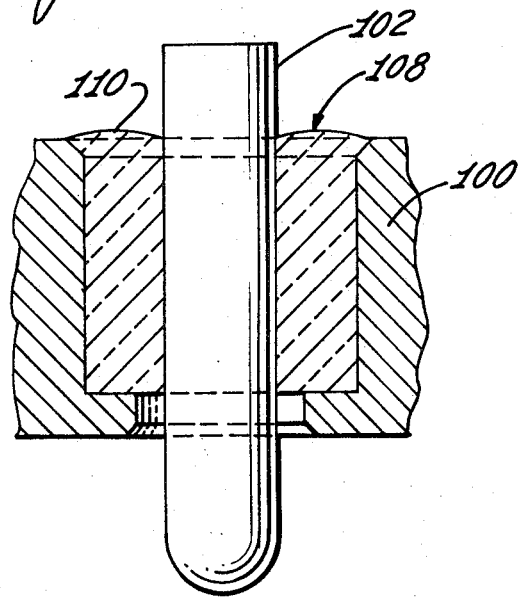

3,545,950
METHOD OF MAKING A GLASS-TO-METAL SEAL
John A. Earl, Alhambra, Calif., assignor to Physical Sciences Corporation, Arcadia, Calif., a corporation of California
Filed June 28, 1967, Ser. No. 649,581
Int. Cl. C03c 29/00
U.S. Cl. 65—59          12 Claims

ABSTRACT OF THE DISCLOSURE

A method for sealing a pin within an outer coaxial housing member wherein the outer housing is formed with an opening extending therethrough, and a sealing member is formed with an opening therethrough and further formed with a cutout portion in one end surrounding the opening in the sealing member; the cutout portion being tapered inwardly of the sealing member. The sealing member is disposed within the opening in the outer housing and a pin is disposed through the opening in the sealing member. The assembly is heated to seal the pin member within the outer housing with the material of the sealing member flowing into the cutout portion but not flowing along the pin member to produce a meniscus.

---

It is presently common to produce a seal between a pin member which is located within an opening in an outer housing. For example, in the manufacture of electrical feedthroughs, electrical connectors and electrical heaters, a pin member is disposed within an opening in an outer housing and a sealing member, such as a ceramic or glass bead, is placed in between the pin member and the outer housing. The sealing members are usually referred to as "beads," and these beads may be constructed from ceramic material, powdered glass or glass-like material. These beads are sintered so as to partially fuse the powdered material and give rigidity to the bead which rigidity facilitates the handling of the beads. The bead members are then placed in position and are fired at a higher temperature so as to flow the bead members to produce a hermetic seal between the pin member and the outer housing. However, as the sealing material flows to produce the seal, the sealing material has a tendency to adhere to the pin member and to creep along the pin member, thereby forming a thin meniscus of sealing material lying against the pin member. During later handling of the assembly, this thin meniscus may crack due to accidental bending or temperature cycling and the cracking of the meniscus allows for a leakage path between the pin and the outer housing so as to destroy the hermetic seal.

The present sealing members are formed with isometric sides and, as indicated above, when the sealing members are fired into the assembly, the melting material of the sealing member adheres to the pin and creeps along the pin while slumping into the interior of the opening formed in the outer housing. This sloping plus the creeping of the sealing material produces the meniscus on the pin member. The present invention is directed to a method and apparatus for producing a pin member sealed within an outer housing wherein the sealing member includes a cutout portion so as to prevent a thin meniscus from forming along the pin member. For example, at one end of the sealing member such as the bead, a step or indentation is formed surrounding the pin member. When the sealing member is fired so as to produce the final seal, the cutout portion does not allow the meniscus to form since the material of the sealing member is flowing to fill in the cutout portion.

The amount of firing may be controlled so as to produce a flat surface or so as to produce a slightly concave or convex surface. The use of this cutout portion in the sealing member, therefore, eliminates the later cracking and destroying of the seal formed in the assembly. Various shapes for the cutout portion may be used so as to produce particular end configurations in accordance with the shape of the cutout portion, the material of which the sealing member is composed and the temperature at which the sealing member is fired. For example, one shape for the cutout portion is a conical surface whereas a second shape for the cutout portion is a toroidal surface. Also, it is to be appreciated that a step surface may be used for the cutout portion.

A clearer understanding of the invention and particular embodiments of the invention will be had with reference to the drawings wherein:

FIG. 5 shows a second embodiment of a sealing member of the present invention having a steeply sloping conical section;

FIG. 6 illustrates a third embodiment of the sealing member of the present invention showing an intermediate sloping conical section;

FIG. 7 illustrates a fourth embodiment of the sealing member of the present invention showing a gradually sloping conical section;

FIG. 8 illustrates a fifth embodiment of the sealing member of the present invention wherein the cutout portion is a toroidal surface which is concave;

FIG. 9 illustrates a sixth embodiment of the sealing member of the present invention wherein the cutout portion is a toroidal surface which is convex;

FIG. 10 is a seventh embodiment of the sealing member of the present invention wherein the cutout portion is a stepped member;

FIG. 11 is an assembly of the present invention after firing wherein the firing is controlled to produce a flat surface extending from the pin member to the outer housing; and FIG. 12 is an assembly of the present invention after firing wherein the firing is controlled to produce a slightly convex surface extending from the pin member to the outer housing.

Figure 1:
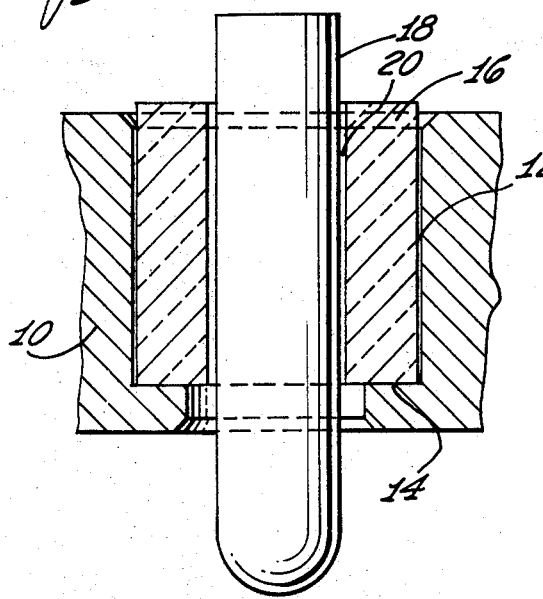
FIG. 1 illustrates a prior art assembly showing a pin member, sealing member and outer housing.

In FIG. 1, a prior art assembly is shown including an outer housing 10 which has an opening 12 extending through the housing member 10. The opening 12 is stepped so that at portion 14 a ledge is formed for the support of a sealing member 16. As can be seen in FIG. 1, the sealing member 16 is merely a circular bead having flat top and bottom surfaces. The outer configuration of the sealing member 16 conforms to the inner configuration of the opening 12. A pin member 18 is disposed within and extends through an opening 20 in the sealing member 16. The pin member 18 also extends through the outer housing 10. The outer configuration of the pin member 18 conforms to the inner configuration of the opening 20 in the sealing member 16. The pin member 18 and the outer housing 10 are usually composed of metal, whereas the sealing member 16 is usually composed of an insulating material such as glass or modified glass or ceramic so as to serve as an insulation between the pin member 18 and the outer housing 10. The material of the sealing member 16 flows when heated so as to produce a seal between the pin member 18 and the outer housing 10. The seal between the pin member 18 and the outer housing 10 may be seen with reference to FIG. 2 which illustrates the assembly of FIG. 1 after firing.

Figure 2:
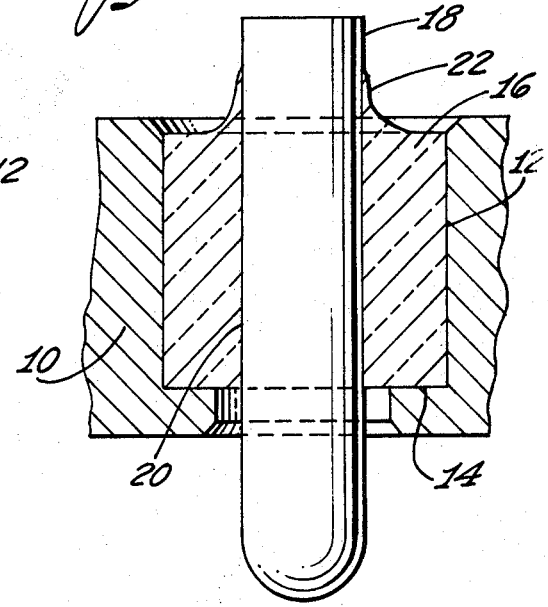
FIG. 2 shows the prior art assembly of FIG. 1 after firing.

In FIG. 2, it can be seen that when the assembly is fired the sealing member 16 flows so as to fill the space between the pin member 18 and the outer housing 10. The flowing of the sealing material of the sealing member 16 causes the sealing member to slump and also the sealing material has a tendency to creep along the pin member 18 so as to produce a meniscus as shown at position 22. As can be seen in FIG. 2, the meniscus 22 is quite thin and would easily break if the pin member 18 is bent off if the assembly of FIG. 2 is temperature cycled. The breaking of this thin meniscus 22 may cause a break in the seal between the pin member 18 and the outer housing 10. It is, therefore, desirable to eliminate the meniscus 22 while still retaining a proper sealing of the pin member 18 within the opening in the outer housing 10.

Figure 3:
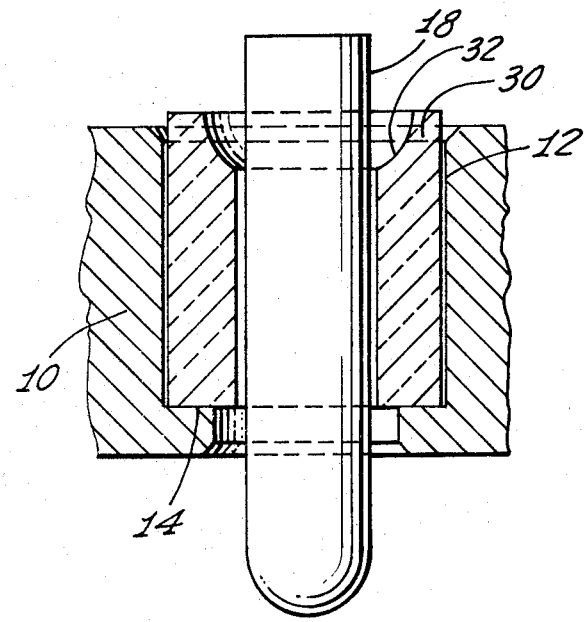
FIG. 3 illustrates a first embodiment of the invention showing an assembly of a pin member, sealing member and outer housing.

FIG. 3 illustrates an assembly according to the present invention including the same outer housing 10 having the opening 12 and the ledge 14. In addition, the pin member 18 is substantially identical to the pin member shown in FIG. 1. However, in FIG. 3 a sealing member 30 constructed in accordance with the teachings of the present invention is substituted for the prior art sealing member. The sealing member 30 includes a cutout portion 32. In the embodiment of FIG. 3, the cutout portion is substantially a toroidal surface which is slightly concave as it faces the pin member 18. The cutout portion 32 prevents the meniscus 22 as shown in FIG. 2 from forming upon the firing of the assembly of FIG. 3. This can be seen with reference to FIG. 4 which is the assembly of FIG. 3 after firing.

Figure 4:
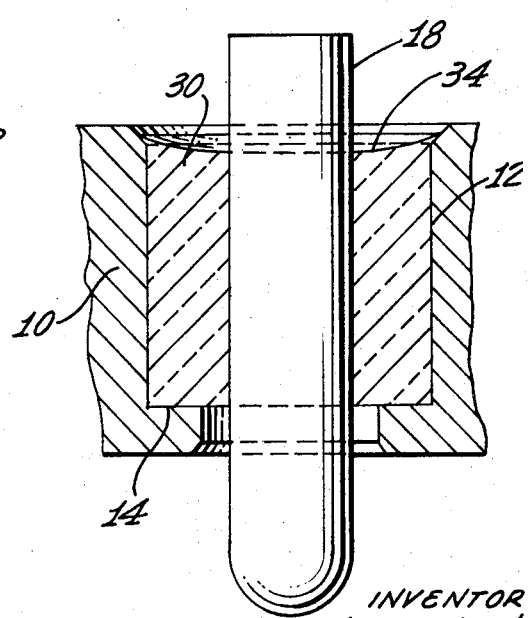
FIG. 4 illustrates the assembly of FIG. 3 after firing.

As shown in FIG. 4, the pin member 18 is sealed within the outer housing 1-0 in the same manner as FIG. 2. However, the sealing member 30 does not include the meniscus 22 shown in FIG. 1. In FIG. 4, the upper surface 34 of the sealing member 30 is gently concave and extends from the pin member to the outer housing 10 without any thin portions such as the meniscus 22 of FIG. 2. The particular shape of this upper surface 34 depends upon the particular mateiral used for the sealing member 30, the shape of the cutout portion 32 and the degree of heating used so as to produce the seal of the pin member 18 within the outer housing 10. It is to be appreciated that a variety of forms of cutout portions may be used so as to produce particular end results and that the factors of the shape of the cutout portion, the material of which the sealing member 30 is composed and the degree of firing can produce other upper surfaces of the sealing member 30 after firing. For example, with reference to the other embodiments of the invention, it can be seen that a variety of cutout portions may be used and that the upper surface can be controlled to be substantially flat or convex.

As an example, in FIG. 5 a sealing member 40 is shown having a cutout portion or bevel 42. As can be seen in FIG. 5, the cutout portion 42 has a conical or bevel surface which is sharply sloping. FIG. 6 illustrates a sealing member 50 having a cutout portion 52. As can be seen in FIG. 6, the cutout portion 52 is also a conical or bevel surface but which is much less than the slope of the cutout portion 42 of FIG. 5. FIG. 7 illustrates another embodiment of a sealing member 60 having a cutout portion 62 wherein the cutout portion 62 is a conical or bevel surface having a gradual slope. FIGS. 5, 6 and 7, therefore, show sealing members all having cutout or bevel portions which are conical surfaces but where the degree of slope is controlled so as to produce a particular desired upper surface for the sealing members after firing.

Other forms of cutout portions may be provided in the sealing member. For example, FIG. 8 illustrates a sealing member 70 having a cutout portion 72 which is similar to the cutout portion 32 of FIG. 3. The cutout portion 72 is a toroidal surface and is concave in relation to the pin member which is to be placed within the opening through the sealing member 70. It is to be appreciated that the cutout portion 72 and also the cutout portion 32 shown in FIG. 3 would tend to produce an upper surface for the sealing member which is gently concave, as shown by upper surface 34 in FIG. 4. It may be desirable sometimes to have an upper surface for the sealing member after firing which is gently convex. A sealing member such as the sealing member 80 shown in FIG. 9 would tend to produce such a convex upper surface. In FIG. 9, the sealing member 80 has the cutout portion 82 which is also a toroidal surface but which is convex in relation to the pin member which is to be inserted through the opening in the sealing member 80.

Other embodiments of sealing members may be constructed. For example, as shown in FIG. 10, a sealing member 90 has a stepped cutout portion 92. It is to be appreciated, therefore, that a variety of cutout portions may be used in accordance with the desired final result. For example, in FIG. 11 an assembly is shown after firing which includes an outer housing 100, a pin member 102 and a sealing member 104. The assembly of FIG. 11 is controlled after firing so as to produce a substatnially flat upper surface 106 for the sealing member 104. This flat upper surface may be produced by adjusting the heating of the assembly so as to control the flow of the sealing material and also by the initial choice of the configuration of the cutout for the sealing member. The flow of the sealing material may also be controlled by the choice of the particular sealing material.

FIG. 12 illustrates another embodiment of an assembly after firing including the outer housing 100, the pin member 102 and a sealing member 108 which has a slightly convex upper surface 110. This upper surface 110 again may be controlled by the choice of sealing material so as to determine its flow, the heating of the assembly, and by the shape of the cutout portion of the sealing member. It is to be appreciated that a cutout portion, such as cutout portion 82 of FIG. 9, would tend to produce an upper surface, such as upper surface 110 of FIG. 12, if the assembly is not overheated, whereas a cutout portion, such as cutout portion 72, would tend to produce an upper surface 34 as shown in FIG. 4.

Although the invention has been illustrated with reference to particular embodiments, it is to be appreciated that various adaptations and modification may be made. The invention, therefore, is only to be limited by the appended claims.

I claim:

1. A method of sealing a pin within an outer coaxial housing member, including the steps of:
    forming an outer housing member with an opening of a first predetermined configuration extending therethrough;
    forming a sealing member composed of a material which flows when heated with an opening of a second predetermined configuration extending through the said sealing member and having an outer configuration conforming to the first predetermined configuration of the opening through the outer housing;
    forming a cutout portion in one end of said sealing member surrounding said opening of second predetermined configuration and being tapered inwardly of said sealing member, the length of said sealing member along the axis of said opening being less than the length of said sealing member along an outer surface thereof;
    disposing the sealing member within the opening in the outer housing;
    disposing a pin member through the opening in the sealing member; and
    heating the assembly of the outer housing, the pin member and the sealing member for sufficient time and at sufficient temperature to produce a flow of the material of the sealing member to seal the pin member within the outer housing and with the material of the sealing member flowing into the cutout portion to produce a surface extending from the pin member to the outer housing and to prevent the flowing of the material from the sealing member along the pin member to form a meniscus.

2. The method of claim 1 wherein the taper is formed as a bevelled surface and the assembly is heated to produce a substantially level surface extending from the pin member to the outer housing.

3. The method of claim 1 wherein the taper is formed as a convex surface and the assembly is heated to produce a slightly convex surface extending from the pin member to the outer housing.

4. The method of claim 1 wherein the taper is formed as a concave surface and the assembly is heated to produce a slightly concave surface extending from the pin member to the outer housing.

5. The method as defined in claim 3 wherein the convex surface is toroidal.

6. The method as defined in claim 4 wherein the concave surface is toroidal.

7. A method of sealing a metal pin within and extending through a metal outer housing, including the steps of:

forming a metal outer housing with a first opening of a predetermined configuration extending partially through the outer housing and a second opening having a smaller configuration than the first opening extending from the first opening and through the outer housing;

forming a sealing member composed of a flowable sealing material having an outer configuration corresponding to the first predetermined configuration of the metal outer housing and with an opening extending through the sealing member having a cutout portion in one end of said sealing member surrounding said last mentioned opening and being tapered inwardly of said sealing member, the length of said sealing member along the axis of said last mentioned opening being less than the length of said sealing member along an outer surface thereof;

providing a metal pin member to fit within the opening of the sealing member;

assembling the metal outer housing, the sealing member and the metal pin member to have the sealing member fit within the first opening in the outer housing and with the cutout portion positioned opposite to the second opening in the outer housing and with the metal pin member positioned to fit within and extending through the opening in the sealing member and the second opening in the outer housing; and heating assembly for sufficient time and sufficient temperature to produce a flow of the material of the sealing member to seal the metal pin member within the outer housing and with the cutout portion of the sealing member substantially preventing the flow of the sealing member along the pin member to form a meniscus.

8. The method of claim 7 wherein the taper is formed as a bevelled surface and the assembly is heated to produce a substantially level surface extending from the metal pin member to the metal outer housing.

9. The method of claim 7 wherein the taper is formed as a convex surface and the assembly is heated to produce a slightly convex surface extending from the metal pin member to the metal outer housing.

10. The method of claim 7 wherein the taper is formed as a concave surface and the assembly is heated to produce a slightly concave surface extending from the metal pin member to the metal outer housing.

11. The method as defined in claim 9 wherein the convex surface is toroidal.

12. The method as defined in claim 10 wherein the concave surface is toroidal.

References Cited

UNITED STATES PATENTS

| 2,066,856 | 1/1937 | Rose | 65—59X |
| 3,203,084 | 8/1965 | Best | 65—59UX |
| 3,370,874 | 2/1968 | Scherer | 65—59X |

FOREIGN PATENTS

| 904,427 | 8/1962 | Great Britain | 287—189.361 |

S. LEON BASHORE, Primary Examiner

S. R. FRIEDMAN, Assistant Examiner

U.S. Cl. X.R.

174—50.61